J. E. W. AND C. E. RICHARDS.
STOCK WATERER.
APPLICATION FILED JUNE 25, 1920.

1,429,535.

Patented Sept. 19, 1922.
2 SHEETS—SHEET 1.

Inventor
J.E.W. RICHARDS
C.E. RICHARDS

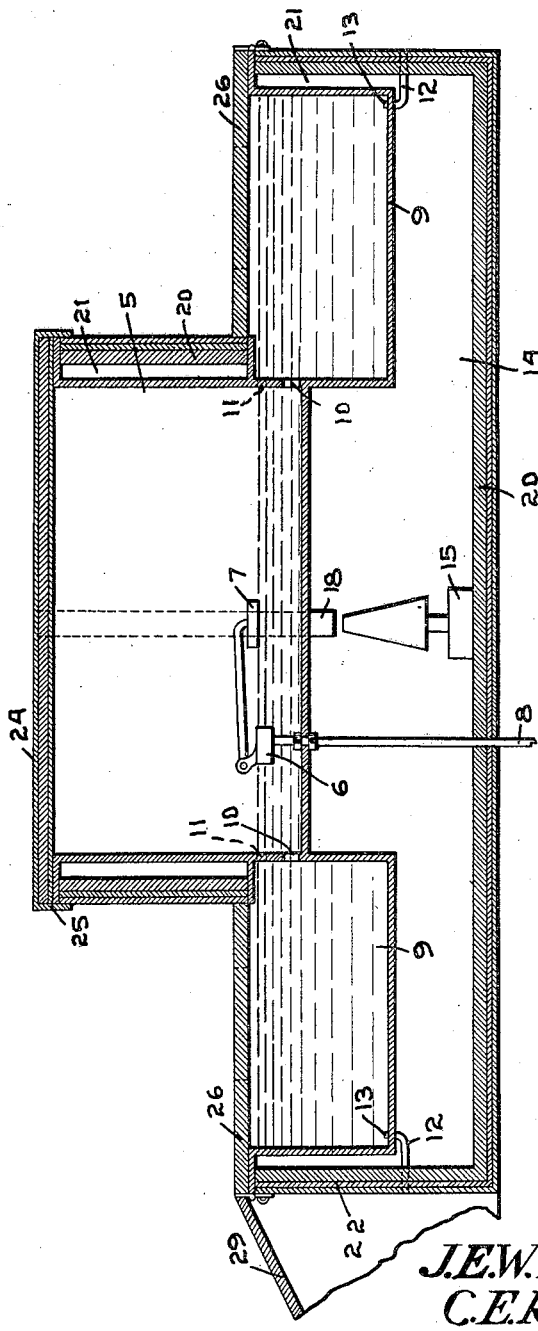

Patented Sept. 19, 1922.

1,429,535

UNITED STATES PATENT OFFICE.

JAMES E. W. RICHARDS AND CHARLES E. RICHARDS, OF ARAPAHOE, NEBRASKA.

STOCK WATERER.

Application filed June 25, 1920. Serial No. 391,692.

*To all whom it may concern:*

Be it known that we, JAMES E. W. RICHARDS and CHARLES E. RICHARDS, citizens of the United States, residing at Arapahoe, in the county of Furnas, State of Nebraska, have invented a new and useful Stock Waterer, of which the following is a specification.

This invention relates to stock watering fountains and has for its object the provision of a device in which a supply of water is maintained at a fixed level in the drinking fountain, provision being made for heating the water in cold weather, also for protecting the water against high temperature in extremely warm weather, so that the water is palatable to the stock at all seasons.

Novel arrangement of the drinking fountains and water heating compartment renders the device sanitary and easily cleanable also provides for a maximum amount of heated water at a minimum expenditure of fuel.

With these and other objects in view, the invention consists in the construction and novel combination of parts hereinafter fully described illustrated in the accompany drawings, and pointed out in the claim hereto appended; it being understood that various changes in the form proportion, size and minor details of construction within the scope of what is claimed, may be resorted to without departing from the spirit of the invention or sacrificing any of the advantages thereof.

In the drawing Figure 1 is a plan view of the device;

Figure 3 is a longitudinal sectional view.

Like numerals of reference designate corresponding parts in all the figures of the drawings.

Figure 1:
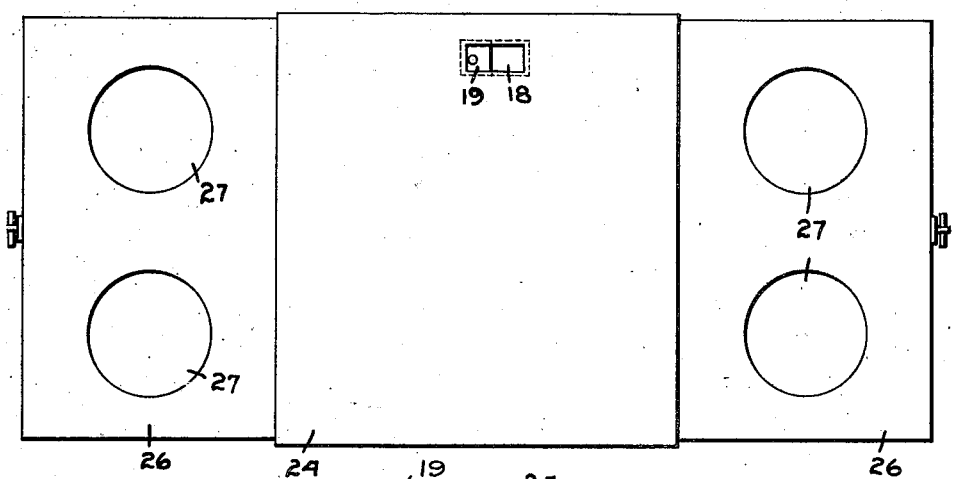
Figure 2:
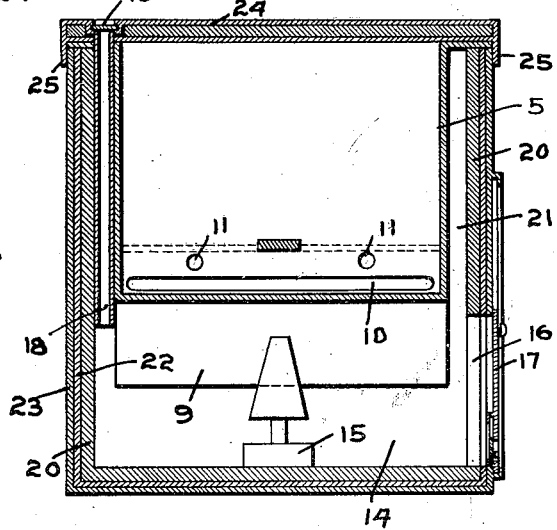
Figure 2 is a transverse section.

In the accompanying drawings in which is illustrated the preferred embodiment of the invention, 5 designates a substantially rectangular tank constituting a reservoir, said tank being provided with an inlet valve 6, the same being under the control of a float 7, whereby a constant level of water is maintained in the tank from any suitable source of supply, the supply pipe being indicated at 8.

A drinking fount 9 is located at each end of the reservoir 5 and communicates therewith through vertically spaced openings 10 and 11 formed in the end wall of the tank.

From an inspection of Figure 3 it will be seen that the bottom of each of the founts 9 is located below the bottom of the reservoir 5 so that any dirt finding its way into the device will sink to the bottom of the tanks 9, from whence it may be drained through an outlet pipe 12, a plug 13 serving to normally close the outlet.

A heating compartment 14 is formed beneath the tanks 5 and 9 and a heating element, such for instance as an oil burning lamp, indicated at 15, is used in cold weather to heat said compartment. A door 16 is provided in one wall of the compartment 14 through which access to the interior may be had for the adjustment of the lamp and a shutter 17, slidably mounted in the door, provides for controlling admission of air to the lamp. A flue 18 located at one side of the tank 5 opens through the top of the device and conducts any fumes that may arise from the heater. A closure 19 is fitted to the top of the flue and is used to entirely close the same if desired.

The bottom and side walls of the device are insulated against the outside temperature by a wall 20 which may be formed of boards or other equally non-conductive material.

The wall 20 is spaced from the walls of the tanks to form a dead air space 21. A covering 22 of paper or like material, further assists in rendering the walls air tight and a casing 23 of sheet metal covers the entire structure, protecting the same.

A top cover 24, constructed in a manner similar to the side walls, is fitted to the top of the tank 5, and has flanges 25 which engage the sides of said tank to prevent displacement of the cover.

A lid 26 is fitted to each of the founts 9 and is provided with openings 27 for the watering of small animals, such as swine, sheep or calves. When used for watering cattle or horses, the lids 26 may be readily removed by releasing the retaining latch indicated at 28.

An inclined walk way 29 is provided, that small animals may mount to a position from which to drink from the opening 27.

It will be observed that the heating element is located approximately central of the bottom of the tank 5, consequently the greater volume of heat from the heater is directed against the bottom of said tank. It will also be observed that the depth of water in the tank 5 is comparatively shallow to the depth in the tanks 9, the water in the tank 5 will therefore be considerably warmer than that in the tanks 9 and it follows that a circulation will be set up between the tanks 5 and 9, through the opening 10 and 11 the heated water passing out of the tank 5 through the opening 11, cold water returning from the tank 9 to the tank 5 by way of the opening 10.

In this manner, drinking water for stock may be kept from freezing or becoming unduly cold in winter. On the other hand during hot weather the insulation of the tank coverings prevents the temperature of the water being raised above the normal temperature of the water supplied to the device and a supply of cool drinking water is always available.

It will also be observed, when an animal is drinking from the fount the heated water in the reservoir will be largely supplied to the fount through the relatively large opening 10 and this opening being located at a point much below the level from which the animal is drinking, should the water in the reservoir be exactly heated, this heated water will not flow into the fount on a level with the surface from which the animal is drinking, but much below the animal's mouth, with the result that the heated water is mixed with the cooler water in the fount, before it reaches the surface and the animal will not be forced to drink excessively heated water. When not in use a slow surface circulation is established as previously described.

Having thus described the invention what is claimed is:

A stock waterer comprising a reservoir and a fount having a common wall, the bottom of the reservoir being located at a higher level than the bottom of the fount, a water supply pipe entering the reservoir, a float-actuated valve controlling the passage of water from the pipe to the reservoir, and means for heating the water in the reservoir, said wall having an elongated slot disposed close to the bottom of the reservoir and below the valve, said wall having spaced openings disposed above the slot and of small area compared with the area of the slot the slot affording a relatively free circulation of water between the fount and the reservoir when the water is in use and decreasing a surface circulation tending to carry excessively heated water in the reservoir through the openings and affording a slow surface circulation between the fount and the reservoir when the water is not in use.

In testimony that we claim the foregoing as our own, we have hereto affixed our signatures.

JAMES E. W. RICHARDS.
CHARLES E. RICHARDS.